Aug. 28, 1928.
G. Y. ALLEN
1,682,461
FREQUENCY REGULATOR
Filed Nov. 5, 1923
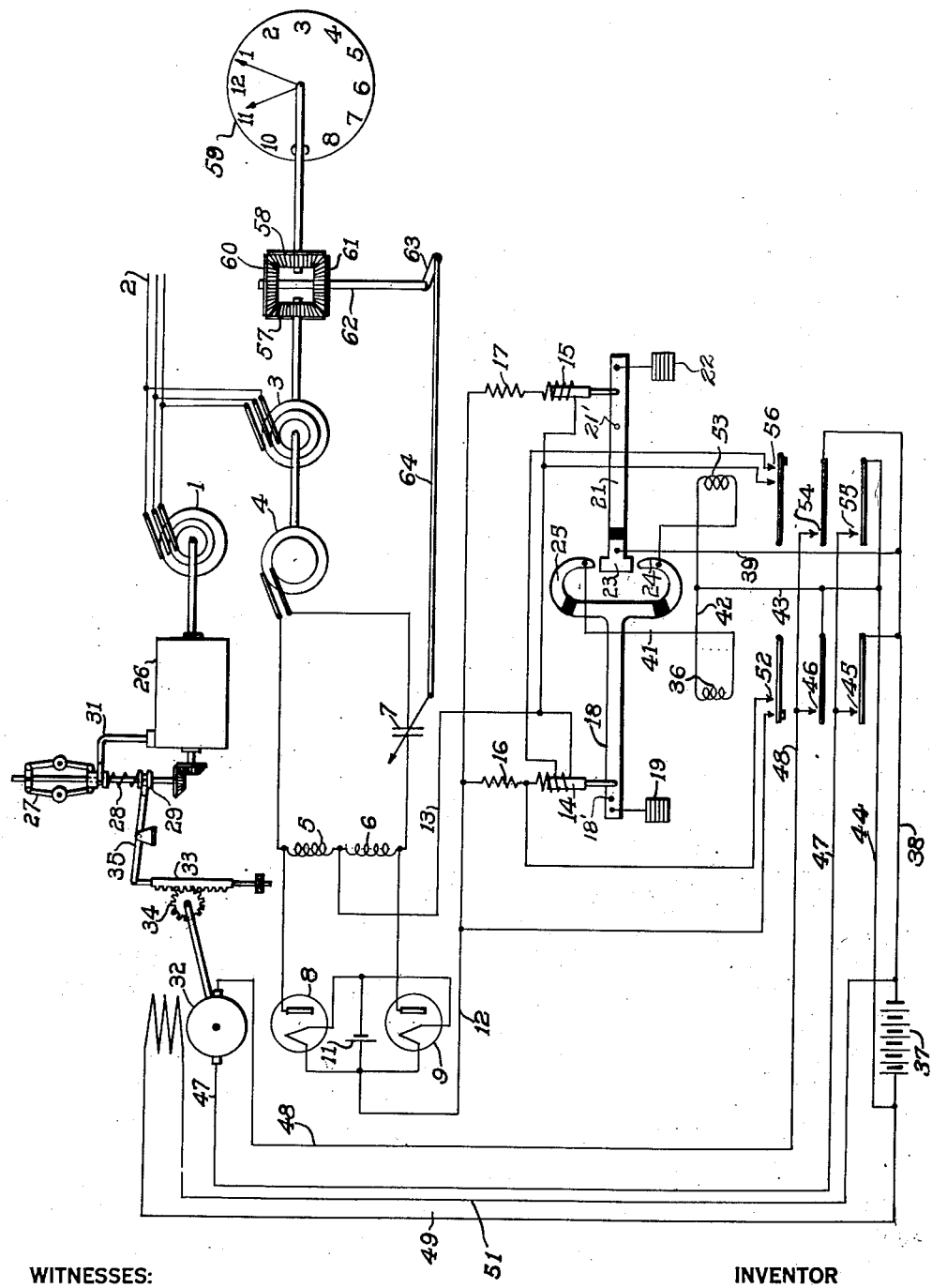
WITNESSES:
A.G.Schiefelbein
W. H. Shitton Jr
INVENTOR
George Y Allen.
BY
Wesley G. Carr
ATTORNEY Patented Aug. 28, 1928.

1,682,461

UNITED STATES PATENT OFFICE.

GEORGE Y. ALLEN, OF EAST ORANGE, NEW JERSEY, ASSIGNOR TO WESTINGHOUSE ELECTRIC & MANUFACTURING COMPANY, A CORPORATION OF PENNSYLVANIA.

FREQUENCY REGULATOR.

Application filed November 5, 1923. Serial No. 672,709.

This invention relates to frequency-regulating systems.

It is an object of this invention to provide a higher degree of precision in the regulation of the frequency than has heretofore been obtainable.

It is a further object of this invention to make use of the narrow limits, within which a high frequency circuit is resonant, for regulating an alternating-current system of commercial frequency.

It is a further object of this invention to regulate the speed of the generator, and, consequently, the frequency of the current, by adjusting the equilibrium position of the governor on the primer mover.

It is a further object of this invention to control the frequency in an alternating-current system by using a correlation between it and a master clock. This object of the invention is especially applicable to alternating-current lines which are used for driving clocks.

It is a further object of this invention to control the frequency by means of a tuned circuit and to control the tuning of this circuit in accordance with the relation between the frequency and the movement of a clock.

It is a further object of this invention to make use of the characteristics of a tuned circuit to control the frequency by means of a relay of the type usually used with a face-plate regulator. This object is accomplished by inserting a rectifier between the tuned circuit and the relay.

Other objects of the invention and details of the construction will be apparent from the following description and the accompanying drawings in which, The single figure is a diagram illustrating the arrangement of the several pieces of apparatus and the connections.

The generator 1 feeds the line 2 with alternating current. As illustrated, this is a three-phase generator and the line has three wires, but the invention is applicable to all types of alternating-current systems. The motor 3, fed from the line 2, is a synchronous motor. It, therefore, drives the generator 4 in strict accordance with the frequency of the current in the line 2. The generator 4 delivers a current of suitable frequency to obtain sharp resonance in the connected circuit. For example, if the generator 1 delivers current of usual commercial frequency, say 25 or 60 cycles, the generator 4 will be designed to deliver a frequency of from 10,000 to 50,000 cycles.

The circuit fed by the generator 4 includes a pair of inductors 5 and 6 and a condenser 7. Such a circuit has a natural period, depending upon the relation between the inductance and the capacity in it. The circuit is so designed that the period differs slightly from the frequency normally delivered by the generator 4. In other words, the point at which the circuit is working will be upon the slope forming the one side of the frequency-current curve. Consequently, small changes in frequency will cause large changes in the current.

If, for example, the standard frequency for the circuit, that is the frequency for which the circuit is resonant, is higher than the normal frequency delivered by the generator 4, a slight increase in frequency will cause a considerable increase in current, and a slight decrease in frequency will cause a considerable decrease in current. Obviously, the same advantages may be obtained by choosing the standard frequency of the circuit slightly below the normal frequency of the generator 4. The direction of the change in the size of the current with the frequency will then be reversed.

The relays best adapted for use with face plate regulators are of a type which respond to direct current. For this reason, a rectifier is inserted between the resonant circuit and the relay. As shown, this rectifier includes a pair of vacuum tubes 8 and 9, each having two electrodes. The anode in the tube 8 is connected to the end of the inductor 5 opposite the inductor 6, and the anode in the tube 9 is connected to the end of the inductor 6 opposite the inductor 5. The cathodes of both tubes are heated by a common battery 11 and are connected to each other and to the relay conductor 12. The other terminal of the relay is connected to the junction of the inductors 5 and 6 by a conductor 13. Although I have illustrated a rectifier of the vacuum-tube, it is obvious that any suitable rectifier may be employed.

The relay includes two solenoids 14 and 15, having resistances 16 and 17, respectively, in series therewith. The solenoids and their resistances are connected in parallel between the wires 12 and 13. The contact-making arm 18 is actuated by the solenoid 14, assisted by a biasing device 19. The biasing device and the solenoid are counteracted by the weight of the arm 18 itself. The contact making arm 21 is actuated by the solenoid 15, which is opposed by the biasing means 22. The arrangement of the pivots is such that, when the solenoids move their plungers upwardly, the arm 18 moves upwardly and the arm 21 moves downwardly so that contact is made between the terminals 23 and 24. For this purpose the pivot 18' of the arm 18 is to the left of the plunger of solenoid 14 and the biasing device 19 to the left of the pivot, while the pivot 21' of the arm 21 is to the left of the plunger of solenoid 15 and the biasing means 22 is to the right of said plunger. On the other hand, when the solenoids permit their plungers to move downwardly, the arm 18 descends and the arm 21 rises, making contact between the terminals 23 and 25.

The generator 1 is driven from any prime mover. For illustration, this is shown as a steam turbine 26, which is supplied with a centrifugal governor 27, acting against a spring 28. The equilibrium between the spring 28 and the centrifugal governor is dependent upon the speed of the governor, the stiffness of the spring and the position of the collar 29, to which one end of the spring is secured. The control rod 31 is positioned by the governor and determines the speed of the prime mover. The position of the collar 29 is altered by means of a motor 32. Any desired train of mechanical connections may be used for enabling the motor to alter the position of the collar 29. As illustrated, a rack 33 meshes with a pinion 34 which is mounted upon the motor shaft. This rack operates a lever 35, the forked end of which embraces the collar 29.

When the collar 29 moves upwardly, the spring 28 is compressed and tends to assist the separation of the balls of the centrifugal governor 27. Consequently, a slower speed will enable the balls to maintain their standard degree of separation. On the other hand, when the collar 29 descends, the spring 28 is elongated and ceases to assist the separation of the balls; a greater speed is, therefore, required to bring the balls to the same degree of separation. The degree of separation of the balls determines the position of the valve. It will be seen, therefore, that any alteration in the position of the collar 29 causes a corresponding change in the speed of the prime mover 26 and, consequently, in the frequency of the current delivered by the generator 1.

If the frequency departs from normal in such direction that the current through the solenoids 14 and 15 diminishes, connection is made between the terminals 23 and 25. The magnet 36 is then energized from the battery 37 over the following circuit; battery 37, conductor 38, conductor 39, terminal 23, terminal 25, conductor 41, magnet 36, conductor 42, conductor 43 and conductor 44. The magnet 36 causes the contacts 45 and 46 to engage, and a circuit is thus established from the battery 37, through conductor 38, contacts 45, conductor 47, the armature of the motor 32, conductor 48, contacts 46 and conductors 43 and 44, to the battery. The field of the motor 32 is permanently energized through conductors 49 and 51. The closure of the contacts 45 and 46, therefore, causes the motor to rotate in the direction which will correct this departure of the frequency from normal.

At the same time, contacts 52 are closed, affording a shunt about resistance 16 and thus increasing the pull of the solenoid 14, so that the contacts 23 and 25 are opened, to prevent hunting action in the system. If the departure from normal frequency is very great, so that, even after the resistance 16 is shunted, contacts 45 and 46 remain in engagement the speed of the motor 32 will become fairly large. The shunting of the resistance will cause the contacts 45 and 46 to open before complete return to normal frequency is accomplished. Therefore, even under most unfavorable conditions, the momentum of the motor will not cause the collar 29 to move too far. If the departure from normal frequency be slight, the contacts 45 and 46 are closed for an instant only, and the motor 32 acquires but slight momentum. If it does not move the collar 29 far enough, the contacts will be again closed, causing the collar to be moved another small distance.

If the frequency in the line 2 departs from the normal in the opposite direction, the terminals 23 and 24 will be closed, causing the magnet 53 to be energized and effecting engagement of the contacts 54 and 55. This closes a circuit from the battery 37, through conductor 38, contacts 54, conductor 48, the armature of the motor 32, conductor 47, contacts 55 and conductor 44, to the battery. It will be observed that the direction of the current through the armature in this case is opposite to that described before. The motor 32, therefore, rotates in the opposite direction, causing the collar 29 to move in the opposite direction, and thus in the direction needed for correcting the frequency. The magnet 53, at the same time that it effects engagement of the contacts 54 and 55, effects engagement of the contacts 56 and thereby establishes a shunt around a portion of the winding of the solenoid 14. This will diminish the lifting effect of the solenoid and, therefore, cause the terminals 23 and 24 to separate. Contacts 54 and 55 will, therefore, be opened promptly enough to prevent the collar 29 from being moved too far.

The motor 3 not only drives the generator 4 but also drives gear wheel 57, which is one member of a differential gear. The drawing, being only diagrammatic, shows only a shaft connecting the motor 3 and the gear 57, but it will be understood that whatever reduction gearing is needed will be inserted between the motor 3 and the gear wheel 57. The opposite gear wheel 58 of the differential is driven by a clock 59. The connection between this gear wheel and the clock is shown as a simple shaft, but, again, it will be understood that whatever gearing is needed will be inserted. The middle member of the differential is shown as comprising two gear wheels 60 and 61, but any means for driving the shaft 62 in accordance with the difference in speed between the motor 3 and the clock 59 may be used instead of the differential gearing specifically shown and described. The shaft 62 is connected, by a crank 63 and a link 64, with the provision for adjustment of the condenser 7. The tuning of the resonant circuit, and, therefore, the standard frequency fixed by this tuning, will be consequently altered by any movement of the shaft 62.

In the operation of the device, if the prime mover 26 drives the generator 1 too fast, the solenoids 14 and 15 will respond to the corresponding change in the current supplied by the resonant circuit to the rectifier. This response by the solenoids will cause energization of the magnet 36 or the magnet 53, depending upon the direction of the departure of the frequency in the line 2 from normal. The energization of the magnet 36 or 53 causes rotation of the motor 32 in the corresponding direction, and, therefore, moves the collar 29 in the direction needed. This adjusts the equilibrium position of the governor and alters the speed of the prime mover and thus corrects the frequency of the generator 1, so that the resonant circuit and the relay controlled thereby maintain the frequency in the line 2 at a normal value.

Small changes in the normal value of the frequency may arise, due to changes in temperature or in other conditions of the resonant circuit. The clock 59 serves to correct these changes. If the normal frequency in the line 2 persistently remains at a value different from that intended the speed of the motor 3 will bear, for a time, a relation to the speed of the clock 59 that does not correspond to the ratio fixed by the reduction gearing and by the gearing between the clock and the wheel 58. Consequently, the gear wheels 57 and 58 will not rotate at the same speed, and the shaft 62 will be turned. Motion of the shaft 62 will cause alteration of the setting of the condenser 27 and so cause a change in the standard frequency of the resonant circuit. The operation of the resonant circuit maintains the frequency in the line 2 at a definite difference from the standard frequency, and the control of the resonant circuit by the clock keeps this standard frequency at the correct value. A very great precision in the frequency may be reliably secured with this regulator.

It will be obvious to those skilled in the art that many details of the construction may be altered without departing from the spirit of the invention and that many applications of the principle thereof beside that illustrated are possible. I do not intend, therefore, that the specific illustration and description of one application of this principle shall limit the invention beyond what is necessitated by the prior art or indicated in the claims

I claim as my invention:

1. In combination, a prime mover, a generator of alternating current driven thereby, a high-frequency motor-generator energized by said alternating current, a circuit fed from said motor-generator and tuned to a frequency slightly different from that normally delivered thereto, a current-responsive device energized from said circuit, and means controlled by said current-responsive device for governing the speed of said prime mover.

2. In combination, a prime mover, a generator of alternating current driven thereby, a high-frequency motor-generator energized synchronously by said alternating current, a circuit fed from said motor generator and tuned to a frequency slightly different from that normally delivered thereto, a rectifier fed by said tuned circuit, a direct-current relay fed by said rectifier, a motor driven in the one or the other direction according to the position of said relay, a speed governor for said prime mover, and means actuated by said motor for adjusting said governor.

3. In a frequency-controlling system, a prime mover, a speed governor therefor, a spring controlling the normal position of said governor, a motor, means actuated by said motor for adjusting said spring, and frequency-controlled devices responsive to the speed of the prime mover and governing said motor.

4. In a frequency-controlling system, a prime mover, a governor therefor including a spring and a speed-controlled part acting against said spring, means for adjusting said spring to control the normal speed of the governor, an electric motor actuating said adjusting means, an alternating-current generator driven by said prime mover, and means responsive to the frequency of the alternating current for controlling said electric motor.

5. In a frequency-controlling system, an alternating-current line, a high-frequency source actuated in accordance with the frequency in said line, a circuit, means acting in response to the difference between said high frequency and a standard high frequency for controlling the conductivity of said circuit, and means in said circuit for controlling the frequency in said alternating-current line.

6. In a frequency-controlling system, an alternating-current line, a high-frequency source actuated in accordance with the frequency in said line, a circuit, means acting in response to the difference between said high frequency and a standard high frequency for controlling said circuit, means in said circuit for controlling the frequency in said alternating-current line, and clock-controlled means for determining said standard high frequency.

7. In combination, an alternating-current line, a frequency-regulating system therefor, including a tuned circuit, a clock, and means controlled jointly by the clock and the frequency in said line for regulating the tuning of said circuit.

8. In combination, an alternating-current line, a frequency-regulating system therefor, including a high-frequency generator, a motor driven from said line and driving said generator, a circuit fed by said generator, tuning means in said circuit, a clock, and means governed by the speed relation between said motor and said clock for adjusting said tuning means.

In testimony whereof, I have hereunto subscribed my name this 24th day of October, 1923.

GEORGE Y. ALLEN.